(12) United States Patent
Leung et al.

(10) Patent No.: US 7,536,533 B2
(45) Date of Patent: May 19, 2009

(54) MCU BASED MOTOR CONTROLLER WITH PRE-LOAD REGISTER AND DMA CONTROLLER

(75) Inventors: Kafai Leung, Austin, TX (US); Des Peter Howlett, Early Reading (GB); Gabriel Vogel, Austin, TX (US)

(73) Assignee: Silicon Laboratories Inc., Austin, TX (US)

( * ) Notice: Subject to any disclaimer, the term of this patent is extended or adjusted under 35 U.S.C. 154(b) by 222 days.

(21) Appl. No.: 11/240,250

(22) Filed: Sep. 30, 2005

(65) Prior Publication Data

US 2007/0198101 A1 Aug. 23, 2007

(51) Int. Cl.
*G06F 15/76* (2006.01)
(52) U.S. Cl. .............................. 712/36; 712/40; 901/24
(58) Field of Classification Search ................... 712/36, 712/40; 901/24
See application file for complete search history.

(56) References Cited

U.S. PATENT DOCUMENTS

| | | | | |
|---|---|---|---|---|
| 4,319,333 A | * | 3/1982 | Hedrick | 702/144 |
| 4,591,969 A | * | 5/1986 | Bloom et al. | 700/78 |
| 4,606,286 A | * | 8/1986 | Engle | 112/470.06 |
| 4,650,957 A | * | 3/1987 | Cullen et al. | 219/124.03 |
| 5,465,361 A | * | 11/1995 | Hoenninger, III | 717/168 |
| 5,640,779 A | * | 6/1997 | Rolloff et al. | 33/514.2 |
| 5,685,651 A | * | 11/1997 | Hayman et al. | 400/88 |
| 5,768,445 A | * | 6/1998 | Troeller et al. | 382/305 |
| 6,195,067 B1 | * | 2/2001 | Gilger | 343/915 |
| 6,261,011 B1 | * | 7/2001 | Day et al. | 400/88 |
| 6,367,993 B2 | * | 4/2002 | Day et al. | 400/88 |
| 6,674,543 B2 | * | 1/2004 | Day et al. | 358/1.8 |
| 2005/0078583 A1 | * | 4/2005 | Suryono et al. | 369/53.31 |

* cited by examiner

*Primary Examiner*—Aimee J Li
(74) *Attorney, Agent, or Firm*—Howison & Arnott, L.L.P.

(57) ABSTRACT

A method is disclosed for generating a sequential pattern of motor control instructions under control of a microcontroller for the purpose of controlling a motor. A pattern of motor control instructions is stored in a memory. A timing circuit is operable to generate a periodic output sync signal. The microcontroller is operable to initiate a sequential Read operation of the memory so as to cause sequential reading and output of motor control instructions from the memory in a predetermined order. Each of the read motor control instructions is then stored in a pre-load buffer after output from the memory. The contents of the pre-load buffer is then transferred to an output buffer in synchronization with the output sync signal, wherein the output of motor control instructions from the memory is not required to be periodic.

18 Claims, 6 Drawing Sheets

FIG. 10 though this should not be limited to this microcontroller. The MCU-BASED MOTOR CONTROLLER WITH PRE-LOAD REGISTER AND DMA CONTROLLER

TECHNICAL FIELD OF THE INVENTION

The present invention pertains in general to circuitry for controlling a stepper motor such as found on the zoom lens of a camera and, more particularly, to the use of a pre-load register and a DMA controller for interfacing with a microcontroller unit (MCU) for outputting stepper patterns or control patterns to a digitally controlled motor.

BACKGROUND OF THE INVENTION

With the advent of digital cameras, there has been an increased need for enhancements to the operation of these cameras. The first digital cameras utilized a fixed focus lens with only digital zoom capabilities. As the digital cameras were accepted and price reductions occurred, additional features were provided for the digital cameras such as optical zoom capabilities. Additionally, there was a need to provide at least manual focusing for these cameras, if not auto focus capabilities.

For the current digital cameras, the auto focus capabilities require some type of motor to facilitate such auto-focus capabilities. As the cameras become smaller, the motors become smaller and more efficient and the batteries become smaller. Thus, there is a need for very efficient control circuitry to control these small motors.

Microcontrollers are utilized to generate the digital values to control digitally controlled motors for the auto-focus feature. In order to provide for low power operation, the lower power microcontrollers have the ability to enter sleep modes, reduce the number of instructions that are executed, etc., to conserve power. However, if a microcontroller is required to both service operations such as calculating the stepper motor pattern and also update the output of the stepper motor, this can provide some issues with respect to synchronization. For example, if the microcontroller is required to output more bits of information than the width of the instruction, then it requires more than one instruction to generate the output instruction. For example, if an 8-bit microcontroller is required to change the state of more than one port, it will then require two or more instructions to specify the output. This will result in the fact that all the pins are not synchronized. Further, when a timer is utilized to generate an interrupt for each stepper motor update in a synchronized system, the microcontroller may not be able to execute the instructions necessary to service the interrupt in a synchronized manner, due to the fact that the microcontroller may be in the middle of servicing another sub-routine, which must be completed before entering the interrupt service routine which is utilized to change the output value. Multi-cycle instructions or other pending interrupts will then create a latency uncertainty. The amount of time the microcontroller requires between receiving the timer interrupt to the execution of the instruction for the pin update can therefore vary from update to update. Additionally, each instruction that is executed by a microcontroller requires processing power which then requires consumption of power. In order to execute all the necessary instructions, it may be necessary to actually utilize a faster processor which translates into more power. The trend in low power applications is to use a slower processor and to offload the processing to external circuitry. Further, if the processor is required to be active during all of the sub-routines, this will result in the processor being inhibited from going into a power-saving mode.

SUMMARY OF THE INVENTION

The present invention disclosed and claimed herein, in one aspect thereof, comprises a method for generating a sequential pattern of motor control instructions under control of a microcontroller for the purpose of controlling a motor. A pattern of motor control instructions is stored in a memory. A timing circuit is operable to generate a periodic output sync signal. The microcontroller is operable to initiate a sequential Read operation of the memory so as to cause sequential reading and output of motor control instructions from the memory in a predetermined order. Each of the read motor control instructions is then stored in a pre-load buffer after output from the memory. The contents of the pre-load buffer is then transferred to an output buffer in synchronization with the output sync signal, wherein the output of motor control instructions from the memory is not required to be periodic.

BRIEF DESCRIPTION OF THE DRAWINGS

For a more complete understanding of the present invention and the advantages thereof, reference is now made to the following description taken in conjunction with the accompanying Drawings in which.

DETAILED DESCRIPTION OF THE INVENTION

Figure 1:
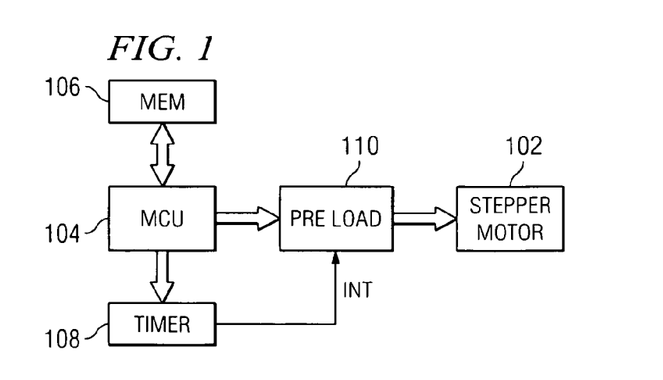
FIG. 1 illustrates a diagrammatic view of the application of the pre-load registers and DMA operation in a typical application of a stepping motor.

Referring now to the drawings, and more particularly to FIG. 1, there is illustrated a diagrammatic view of a digitally controlled stepper motor 102 and the control circuitry associated therewith for generating the control signals for controlling the motor 102. In general, stepper motors can provide a motive force to numerous devices such as printers, plotters, copiers, etc. In some embedded systems, such as the camera, the stepper motor 102 is utilized for auto-focus functions associated with the lens. These embedded systems utilize microcontrollers, which are utilized in this embodiment as an MCU 104, this being a microcontroller unit which is similar to the C8051F300, manufactured by Silicon Laboratories Inc.

The MCU 104 has associated therewith a memory 106 for storing patterns that are utilized to generate each step, a timer 108 which is operable to provide a timer to generate time increments for each step and a pre-load register 110 for storing the contents of the MCU 104.

The MCU 104 is operable to perform multiple functions, one of which is to generate the digital values for each step of stepper motor 102. These steps are typically generated in accordance with interrupts that are generated from the output of the timer 108. For each interrupt, a stepper instruction is output to control the motor. As will be described hereinbelow, the MCU 104 is operable to pre-load the instruction into the pre-load circuit 110 such that the output of such instruction value is controlled by timer 108 through the interrupt. Typically, a stepper motor will increment 0.8° to 1.8°. Typically, a pattern of instructions will be predetermined and stored in a pattern memory, and this pattern will be output in a sequential manner in accordance with the interrupt. By increasing the time base of the timer, the speed of the output of instructions can be increased and, hence, the speed of the motor can be increased.

In general, the stepper motor 102 can incorporate multiple different types of stepper motors. These stepper motors can be classified by their motor constructions, drive topology and stepping pattern. Two common drive topologies for stepper motors are unipolar and bipolar. The unipolar drive utilizes four transistors to drive the two phases of the stepper motor. The motor has two center-tap windings with six wires emanating from the motor. Transistor switches are utilized to connect each of the leads of the motor to a common terminal, the gates of these transistors controlled by the output instruction from the pre-load circuit 110.

The stepper motor 102 is operable to incrementally move by a certain number of degrees per step, each step incremented in accordance with an instruction. A plurality of these steps results in a "pattern." Some stepping instructions are full-step instructions and some are half-step instructions. The pattern is predetermined to account for the linearity of the move, the acceleration of the move, the motor construction, etc. The rate at which the instructions are output determines the speed of the motor and this is determined by the frequency of generation of the interrupt outputs from the timer 108. The generation of these patterns is well known in the art. See Ken Berringer, "Linear Velocity Control Stepper Motors," Incremental Motions Symposium, June 1999.

In operation, the patterns are pre-stored in memory 106 and the MCU 104 is operable to extract the patterns and store each individual instruction in the pre-load register 110. The timer 108 then generates the interrupt on a periodic basis, causing the contents of the pre-load circuitry 110 to be output to drive stepper motor 102. Each pattern and the associated instructions will define a portion of the arc of travel in degrees. For example, a typical step is around 1.8° and a typical pattern will have four instructions to traverse 7.2°, this constituting the necessary different instructions to cause the motor to traverse from a start position to an end position over that path. The reason for the different instructions is that the construction of the motor where teeth have to traverse each other for the given "full path" requires a different instruction for each of the four steps in the full pattern, as each step involves a different relationship between the teeth. Thereafter, the pattern will be the same for each 7.2° of travel. Further, the travel can start and stop at any instruction in the pattern. It is just necessary to ensure that the control system has knowledge of where in the pattern the position of the motor is.

Figure 2:
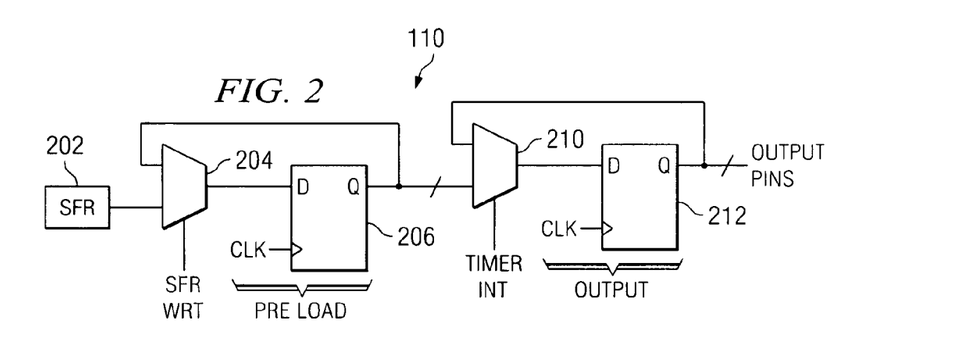
FIG. 2 illustrates a block diagram of the pre-load registers in the pre-load register operation.

Referring now to FIG. 2, there is illustrated a more detailed block diagram of the pre-load circuitry 110. The MCU 104 has a plurality of special function registers (SFR) associated therewith, one of the special function registers 202 associated with the pattern instruction. Each instruction in the pattern is termed a "pattern instruction" that is generated for use to provide a single step in the motor rotation. This is output to a multiplexer 204 that is operable, in response to an SFR Write signal, to output the digital word representing the pattern instruction to the data-input of D-input flip-flop 206. The flip-flop 206 is clocked by the system clock. Therefore, when the pattern instruction is generated by the MCU, it is written to the input of flip-flop 206 and then, upon the occurrence of the next system clock, clocked to the output thereof. The SFR Write signal is then de-asserted and the output of the flip-flop 206 is input back to another input of the multiplexer 204, this selected as the input, such that it is latched onto the flip-flop 206. This is the pre-load latch. The output of the pre-load latch, the Q-output of the flip-flop 206, is input to one input of the two-input multiplexer 210. The output of the multiplexer 210 is input to the D-input of a second D-type flip-flop 212, the Q-output thereof input back to the other input of the multiplexer 210. The multiplexer 210 is controlled by the timer interrupt signal. Therefore, upon generation of the timer interrupt, the output of the flip-flop 206 is transferred to the D-input of the flip-flop 212, which is controlled by the system clock signal for clocking through the data to the queue-output thereof. When the timer interrupt signal is de-asserted, this value will be latched in the D-flip-flop 212. This is referred to as the output latch. The output of the D-flip-flop 212 provides the output of the pattern instruction to the driver circuitry and to the stepper motor 102.

The pattern instructions, for a properly operating stepper motor, are required to be generated in a periodic manner. The MCU 104, however, operates based upon instructions. If the MCU 104 is servicing a routine when an interrupt is received from the timer 108, the MCU must wait for at least one or two instructions before generating the pattern, or fetching the pattern from memory, and providing it as an output. By utilizing the pre-load circuitry in the form of the D-type flip-flop 206, it is possible to allow the pattern to be generated or fetched from memory at any time between interrupts. This is even more important when the databus associated with the MCU 104 is a first width, such as 8-bits, and the output control signal is a second width, such as 16-bits. In this configuration, the MCU 104 would require at least two instructions in order to generate the 16-bit output, since two 8-bit words would have to be output in a sequential manner. Thus, the pre-load register allows the MCU 104 to generate the pattern instructions asynchronous with respect to the output thereof.

Figure 3:
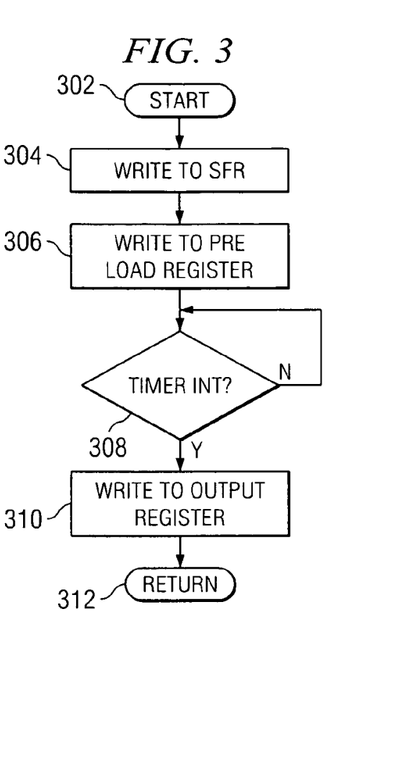
FIG. 3 illustrates a flow chart for the pre-load register operation.

Referring now to FIG. 3, there is illustrated a flow chart depicting the operation of FIGS. 1 and 2. The program is initiated at a start block 302 and then proceeds to the function block 304 to write the output operation information to the SFR. This involves a fetch operation from memory in response to either an interrupt or in response to the prior interrupt having been generated. The program then flows to a function block 306 to write this information to the pre-load register and then to a decision block 308 in order to determine if the timer interrupt has been generated. When generated, the program flows along a "Y" path to a function block 310 to write the pre-load information into the output register and latch this information therein. The program then flows to a return block 312. Typically, this information will continue to be written until the full pattern or a portion thereof is stepped through, such a predetermined number of steps have been exercised to achieve the total desired traversal in degrees. For example, if a total traversal of 90° were desired, this would require that fifty steps be executed. This would result in twenty two and one half patterns being executed, and the terminus being in the middle of a full pattern. Of course, this is a relative position, as it is only necessary to execute four different pattern instructions until they are repeated.

Figure 4:
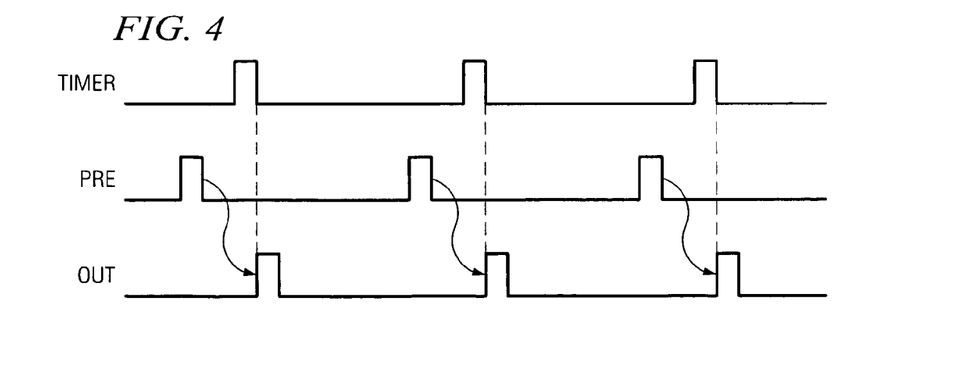
FIG. 4 illustrates a timing diagram for the pre-load operation.

Referring now to FIG. 4, there is illustrated a timing diagram. In the timing diagram, the timer interrupt is illustrated on the top line and the contents of the pre-load register are illustrated on the second line. It can be seen that the pre-load register is loaded before the occurrence of the timer interrupt, and upon occurrence of the timer interrupt, the contents of the pre-load register are loaded into the output register.

Figure 5:
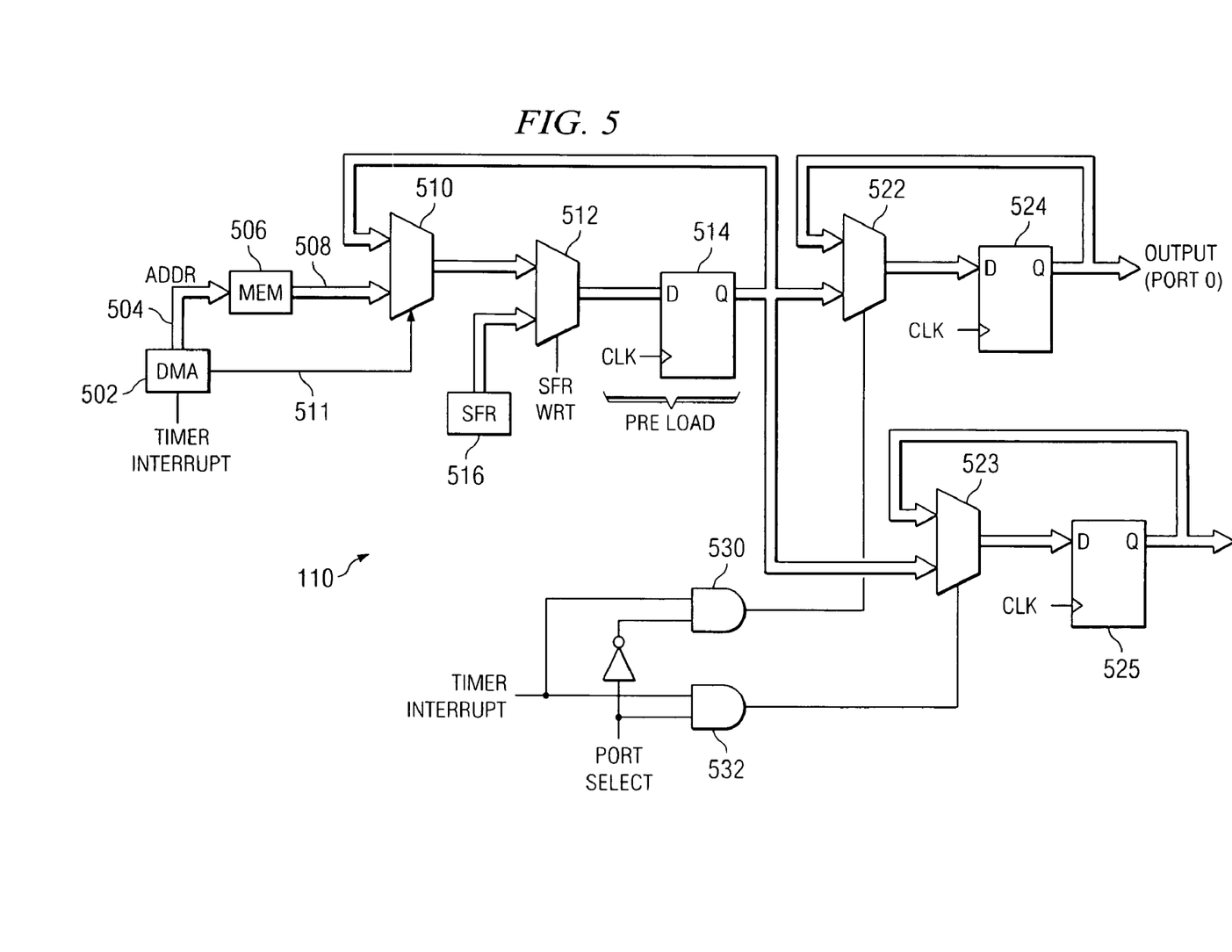
FIG. 5 illustrates a block diagram for the DMA/pre-load register operation.

Referring now to FIG. 5, there is illustrated an alternate embodiment utilizing direct memory access. Direct memory access allows circuitry other than the processor to access memory directly by generating an address and a Read command such that the memory places the data and the memory onto the databus and outputs it on the appropriate input/output circuit. A DMA 502 is illustrated that generates addresses on address bus 504 for input to a pattern memory 506. The pattern memory 506 outputs pattern instructions on a databus 508 for input to a multiplexer 510. The output of the multiplexer 510 is input to one input of the second multiplexer 512, the output thereof input to the D-input of a flip-flop 514. The other input of the multiplexer 510 is connected to the output of the Q-output of the flip-flop 514. The other input of the multiplexer 512 is connected to the output of an SFR register 516. The multiplexer 510 is controlled by the DMA, which generates the address and outputs the data onto the databus 508 after each access and the multiplexer 512 is controlled by an SFR Write signal such that the DMA operation can be bypassed and the system operated with an MCU controller. In this configuration, the multiplexer 510 will be configured so as to connect the Q-output of flip-flop 514 with the first input of the multiplexer 512. The flip-flop 514 therefore provides the pre-load register functionality.

The output of the flip-flop 514 is connected to one input of a multiplexer 522, the output thereof connected to the D-input of a flip-flop 524. Flip-flop 524 has the Q-output thereof connected back to the second input of the multiplexer 522, the output of the flip-flip 524 providing the output of the pre-load circuitry 110. This flip-flop 524 comprises the output register for port 0. When the data bus is a smaller width that the pattern instruction, a second port will be required. This is facilitated by connecting the output of the flip-flop 514 to one input of a multiplexer 523, the output thereof connected to the D-input of a flip-flop 525. Flip-flop 525 has the Q-output thereof connected back to the second input of the multiplexer 523, the output of the flip-flip 525 providing the output of the pre-load circuitry 110 for this second memory access. This flip-flop 525 comprises the output register for port 1. Flip-flops 514, 524 and 525 are clocked by the system clock signal. The multiplexers 522 and 523 are clocked by the timer interrupt signal. Two AND gates 530 and 532 gate the timer interrupt signal to the inputs of the multiplexers 522 and 523, respectively. Each of the AND gates 530 and 532 have one input thereof connected to the timer interrupt signal and the other input thereof connected to the PORT SELECT signal or the PORT SELECT-Bar signal.

In general operation, the DMA is loaded with a pattern value which represents the number of steps in the pattern, the number of times a pattern instruction is to be executed, etc. The DMA is therefore controlled by the timer interrupt to increment a pattern counter internal thereto to generate in a sequential manner pattern addresses in the memory 506. This will sequentially output, for each timer interrupt, a pattern instruction. This pattern instruction will be loaded into the pre-load register 514 and then to the output latch on the occurrence of the timer interrupt, which controls the multiplexer 522. In this manner, all that has to be provided to the DMA 502 is the information as to which pattern to output and how many times to output this pattern. Therefore, once the DMA is initiated, the MCU can then perform other instructions or the MCU could actually be put into a low power or "sleep" mode of operation. This is the mode of operation which typically incorporates the operation of terminating the operation of the clock to stop the operation of the MCU circuitry, thus substantially decreasing power usage. In this manner, the last state of the MCU circuitry will be retained and it can resume the operation merely by resuming the operation of the clock circuitry. The only power that would be drawn is that associated with the operation of the timer and the operation of the DMA.

Figure 6:
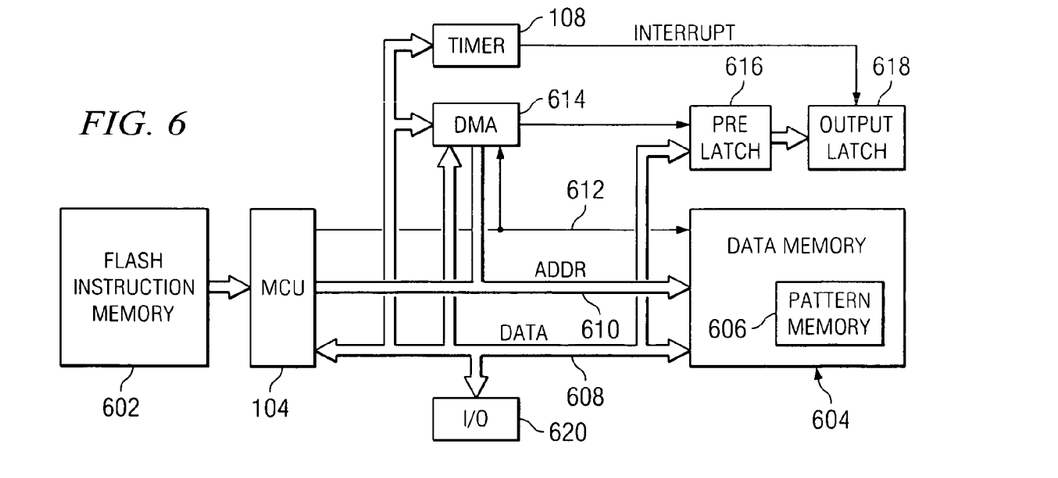
FIG. 6 illustrates a more detailed block diagram of the DMA operation.

Referring now to FIG. 6, there is illustrated a more detailed diagram of the operation of the DMA and the pattern generation. In this embodiment, a flash memory 602 is provided for storing the pattern. The MCU 104 is operable to access the flash memory 602 to extract the pattern and transfer it to data memory 604. Data memory is typically faster type memory such as DRAM. Typically, there will be some portion of the memory space that will be associated with pattern memory, this being a pattern memory space 606. The MCU 104 is operable to transfer data between the pattern memory and other circuitry associated therewith via a databus 608 and address the memory with an address bus 610. Memory access is provided by a memory access control bus 612. Thus, an address can be input to the data memory 604 and data output therefrom on a databus.

A DMA circuit 614 is interfaced with the address bus to generate addresses for the data memory 604. The databus 608 is operable to be input to a pre-latch circuit 616 as described hereinabove, the output thereof input to an output latch 618, which is loaded in accordance with an interrupt signal received from the timer 108. The DMA also is operable to receive control data from the MCU 104, as the DMA can be connected to the databus to allow control information to be provided thereto. However, the DMA can also have associated therewith an SFR such that configuration information can be loaded therein from the MCU 104. The timer 108 also can be controlled by the MCU 104 through an SFR such that the timer rate can be varied.

Figure 7:
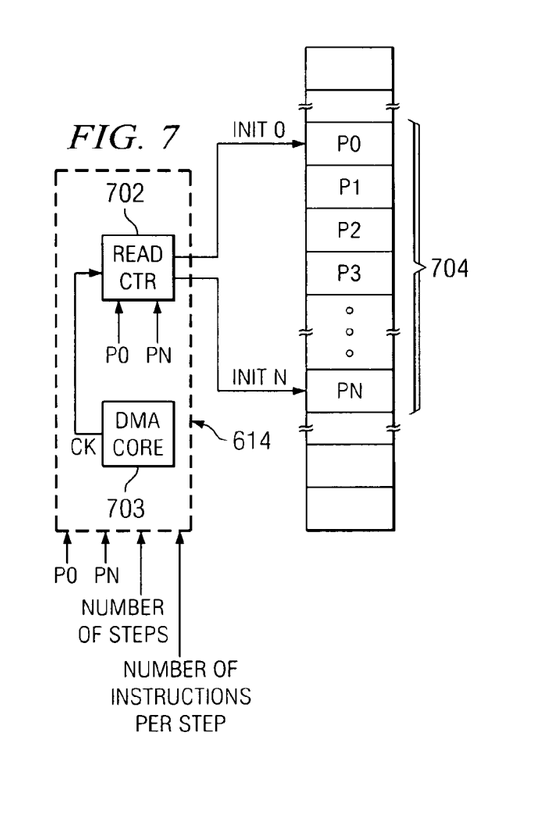
FIG. 7 illustrates a diagrammatic view of the memory map.

Referring now to FIG. 7, there is illustrated a more detailed diagrammatic view of a Read counter 702 associated with the DMA 614. This Read counter is operable to count from an initial value in the pattern, which pattern is stored between memory locations INIT0 and INITN. The counter can start at any location in the pattern and is clocked by a DMA core 703. Each of these values is associated with a particular portion of the memory map, for adjacent memory locations 704. The values that are provided to the counter 702 by the microcontroller are the address of the start and stop location of the pattern in the memory and the output count value of the initial output pattern instruction (when starting in the middle portion of a pattern). The DMA receives the number of steps for the total path of traversal and the number of ports such that wider instruction words can be accommodated. Thus, all that is required is to enter the initial address, which can be hard coded into the counter 702 such that a particular location of a memory is always associated with instruction patterns, and the terminus address of the pattern. Alternatively, this could be any location in the memory.

Figure 8:
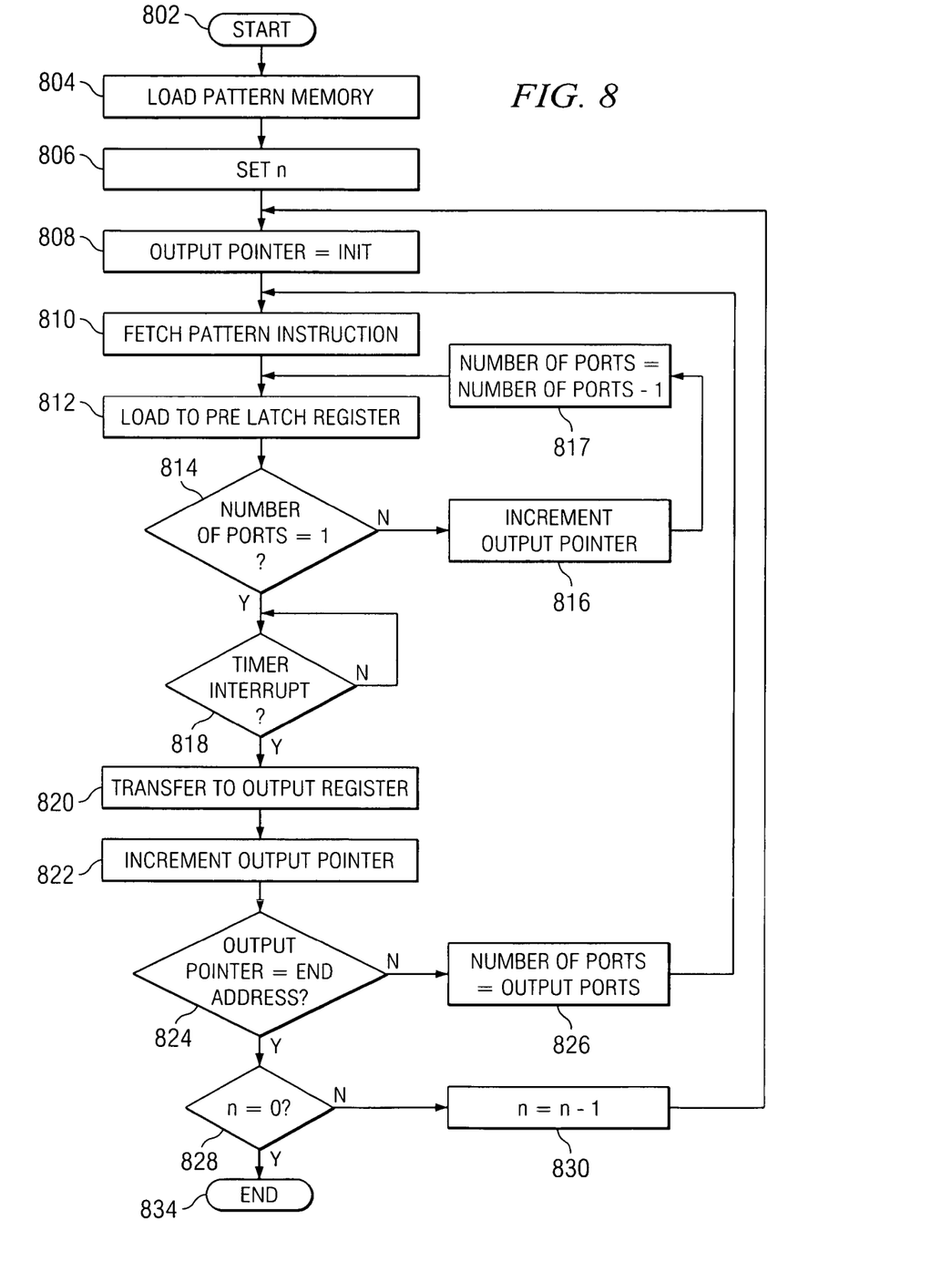
FIG. 8 illustrates a flow chart for the operation of the DMA.

Referring now to FIG. 8, there is illustrated a flow chart for the operation of the DMA wherein the output is comprised of a plurality of different instructions in a given pattern, each instruction comprising a "pattern instruction," wherein for each pattern instruction output there will be a step (or half-step) of the motor. The pattern will comprise the full sequence of steps needed to make a move. As noted hereinabove, each step for a conventional stepper motor will be somewhere between 0.9° for a half step to 1.8° for a full step, wherein a full pattern is 7.2°. The application determines the resolution of the motor movement, hence, the stepping angle. A defined number of pattern steps gives a desired stepping angle. The rotation distance may require the pattern to be repeated multiple times and even a fraction of a pattern. Additionally, it could be that there are multiple patterns for a given sequence of patterns that would be required. This is all controlled by the microprocessor, as the microprocessor determines which pattern is to be transferred from the flash memory to the pattern memory. By determining which pattern is transferred to data memory, the algorithm associated with the "move" of the stepper motor can be predetermined. However, typically, there is only a single pattern.

With further reference to FIG. 8, the flow chart is initiated at a start block 802 and then proceeds to a function block 804 to load the pattern memory from flash memory. Again, as noted hereinabove, this transfer of data is typically transferred to a predetermined location in the memory map of the data memory. The program then flows to a function block 806 to set the value of "n." This sets the number of patterns that are to be output. The program then flows to a function block 807 to set the number of output ports of information that is stored in an SFR. The program then flows to a function block 808 to initialize the output pointer to the first memory location in the pattern memory area of the data memory. The program then flows to a function block 810 to fetch the pattern instruction at that output pointer location. The program then flows to a function block 812 to load this fetched instruction into the pre-latch register. The program then flows to a function block 814 to determine the number of ports and whether that number of ports is greater than unity. This is the case where the width of the databus associated with the CPU or the memory is narrower than the output data, i.e., an 8-bit wide memory output being directed to a 16-bit output port. This, of course, will require, in this example, two reads of the memory. If the indication is that the number of ports is not unity, the program flows along an "N" path to a function block 816 to increment the output pointer and decrement the number of ports by one in function block 817, and then back to the input of the function block 810. This path repeats through decision block 814 until this decision block 814 is at a unity value. Once the output pointer has been incremented and the decision of decision block 814 has been ignored, the program will flow along the "Y" path to a decision block 818 to determine if the timer interrupt has occurred. When the timer interrupt has occurred, this will cause the data stored in the pre-latch register to be transferred to the output register. This is indicated by a function block 820 at the "Y" output of the decision block 818. As noted hereinabove, the pre-latch register 812 is loaded under the control of the DMA. The output register, however, is loaded in response to the timer interrupt. Of course, the timer interrupt also is fed to the DMA such that the next read can occur after the timer interrupt has occurred transferring data to the output register. This will be a short pulse that will transfer and latch the information from the pre-latch register to the output register.

After loading the output register, the program flows to a function block 822 in order to increment the output of pointer and then flows to a decision block 824 to determine if the end of operation (EOO) has occurred. This is the situation wherein the pattern has been completely processed there through. This is facilitated when the output pointer equals the end address stored in an SFR. This indicates that it is the end of the pattern sequence or the last step in the total number of steps, which can occur in the middle of a pattern. (Note that the "n" value sets the number of times the pattern is to be fully executed, this example requiring there to be a total number of steps that is a multiple of the total number of steps in the pattern. It should be understood that fractional values of "n" can be accommodated.) Once the pattern has been stepped through from the initial value to the "n" value, the program flows along a "Y" path to a decision block 828 to determine if all of the patterns have been executed "n" times. If not, the program flows along a "N" path to function block 830 to decrement the value of "n" and then back to the input of the function block 808 to initiate the output pointer and execute the pattern again. Once the predetermined number of patterns has been executed, the program flows along a "Y" path to an End block 834.

Figure 9:
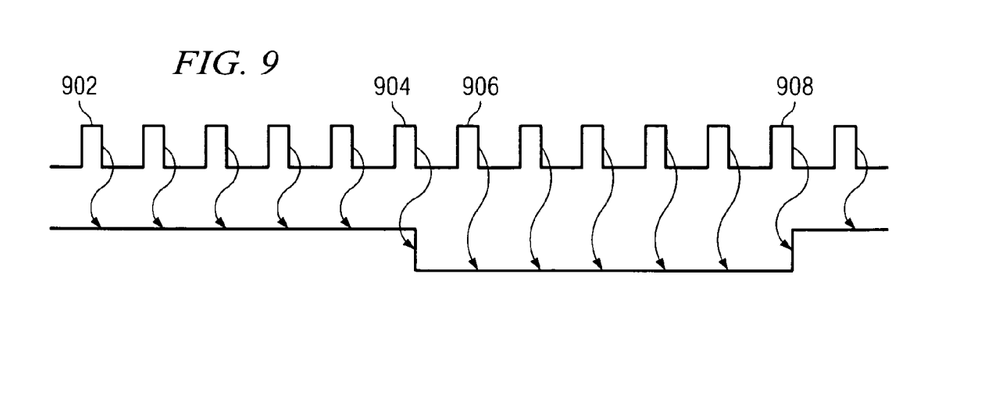
FIG. 9 illustrates a timing diagram for a pulse width modulated controlled motor.

Referring now to FIG. 9, there is illustrated an alternate embodiment for driving a DC motor that utilizes a pulse width modulated control voltage. The DC motor is incremented by a predetermined step as a function of the length of a pulse. Basically, the pattern will require a predetermined number of steps, each of which is associated with an interrupt of the timer. The timer determines the resolution of the pulse and each step will either cause the pulse to remain high or to remain low or to change from high to low. Thus, it is necessary for the pattern to be a sequence of logic "1's" or logic "0's" as an output. It can be seen in FIG. 9 that a timer pulse 902, for example, results in a logic "1" being output. At a later time, a timer pulse 904 indicates that a logic "0" is to be output and there is a transition that occurs. Thereafter, the next logic pulse, a timer interrupt pulse 906, maintains the output at a logic "0." This will continue until another transition, possibly, at a timer interrupt pulse 908 to a logic "1."

Figure 10:
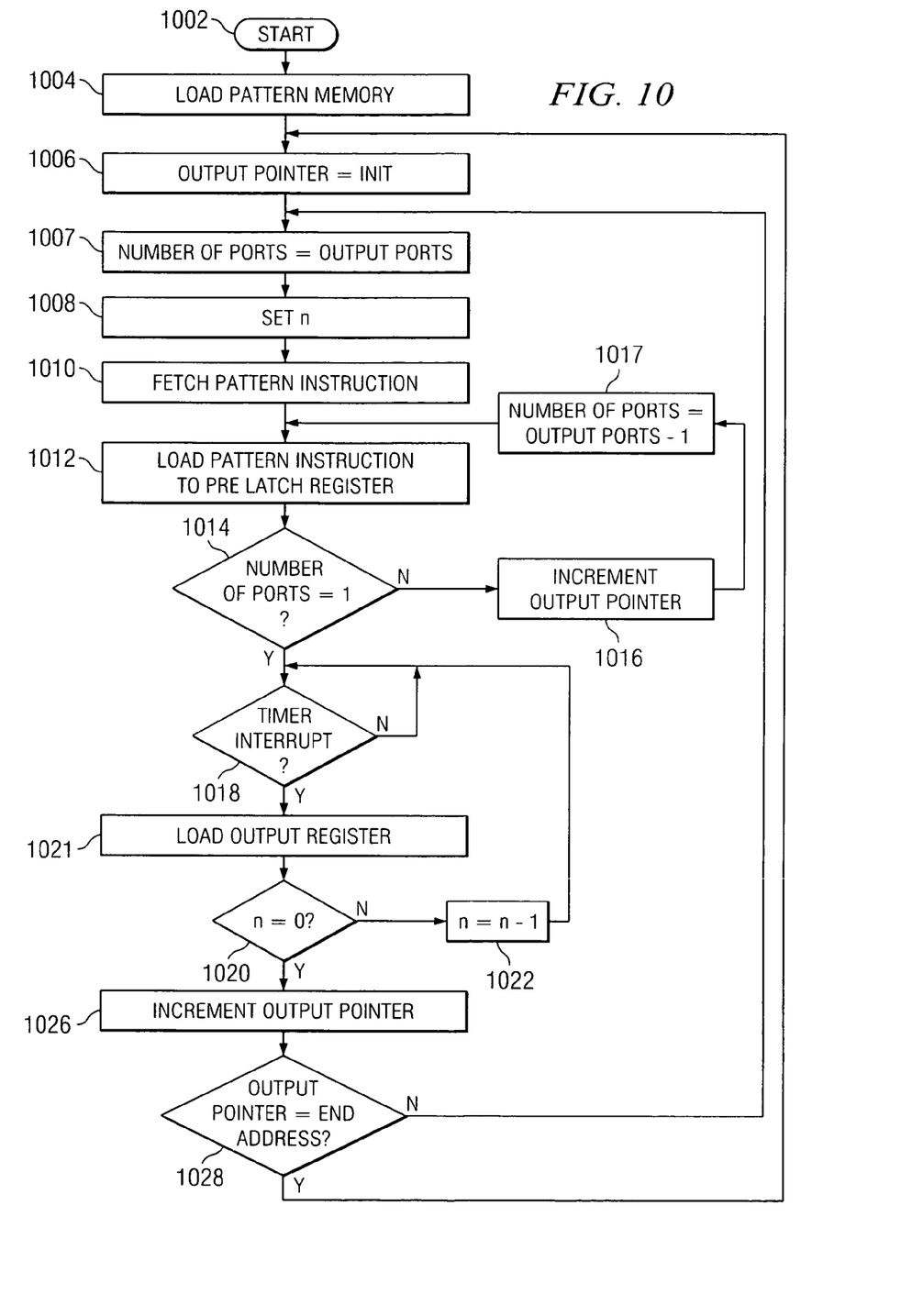
FIG. 10 illustrates a flow chart of the DMA operation for the PWM motor.

Referring now to FIG. 10, there is illustrated a flow chart for the pulse width modulated output. This is initiated at a start block 1002 and then proceeds to a function block 1004 to load the pattern memory, as was noted hereinabove with respect to the flow chart of FIG. 8. The program then flows to a function block 1006 to initiate the output pointer for a given pattern. The program then flows to a function block 1007 to set the number of ports. The program then flows to a function block 1008 to set the value of "n" to a predetermined number of repeats for a given pattern instruction. Pattern instruction could be an instruction such as setting the value to a logic "1." The program then flows to a function block 1010 to fetch the pattern instruction and then to a function block 1012 to load the pattern instruction to the pre-latch register. Again, as described hereinabove, the DMA controls the loads into the pre-latch register, which occurs after a read has been complete of the pattern memory. The program then flows to a decision block 1014 to determine if the number of ports is greater than unity and, if so, the program flows along the "N" path to a function block 1016 to increment the output pointer and flows to a function block 1017 to decrement the number of ports, and then flows back to the input of the function block 1012. The program then flows along the "Y" path from decision block 1014, when the number of ports is at unity, to a decision block 1018 to determine if the timer interrupt has occurred. Once the timer interrupt has occurred, the program flows along the "Y" path to a function block 1021 to load the output register with the contents of the pre-latch register, and then to a decision block 1020 to determine if the value of "n" is equal to zero. If not, the program flows along a "N" path to a function block 1022 in order to decrement the value of "n." The number of ports is set back to the pre-stored value in the appropriate SFR register at function block 1022. The program then proceeds from the function block 1022 back to the input to decision block 1018, since a new instruction is not required to be fetched. As such, the DMA can operate to load the already fetched pattern instruction from the pre-latch register to the output register for each decrement of the value of "n" or otherwise.

Once the pattern instruction that has been output is output the predetermined number of times, "n," then the program will flow from the decision block 1020 to a function block 1026 in order to increment the output pointer and then to a decision block 1028 to determine last output pointer value associated with the last step in the desired number of steps has occurred, i.e., it is the last instruction output to achieve the desired rotational position. If not, the program flows back to the input of function block 1008 to repeat the pattern again. As noted hereinabove, the pattern may be to maintain the output at a logic "1" for a predetermined number of timer interrupt cycles and then to a logic "0" for a predetermined of timer interrupt cycles. This pattern may be repeated a number of time such that each step is repeated for a predetermined number of steps. Once this occurs, the program flows along a "Y" path from the decision block 1028, indicating that the entire pattern has been output.

Figure 11:
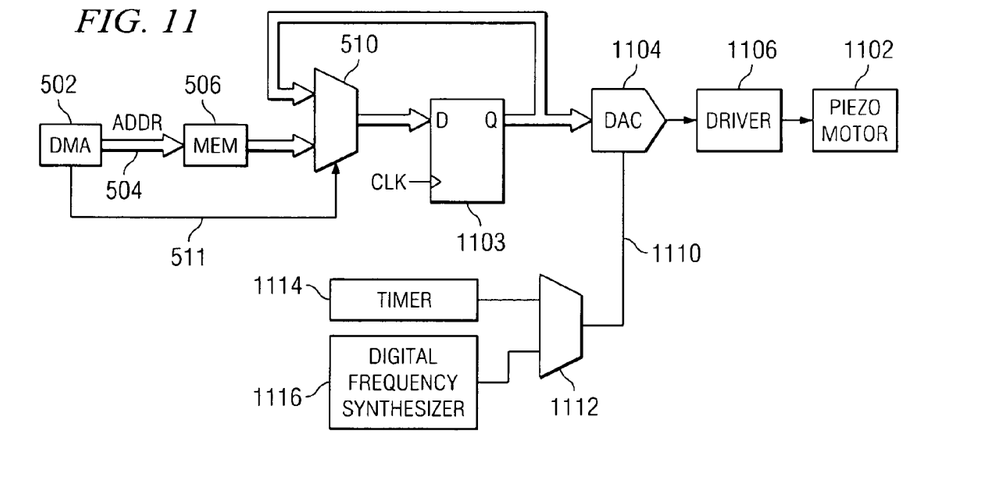
FIG. 11 illustrates a block diagram of a motor controller utilizing an analog output for driving a piezoelectric motor.

Referring now to FIG. 11, there is illustrated a diagrammatic view of an alternate embodiment utilizing an output to drive the input of a piezoelectric motor 1102. A piezoelectric motor receives from the input thereon two analog sinusoidal signals at different phases to control the operation thereof. A piezoelectric motor is an electric motor based upon the change in shape of a piezoelectric material when an electric field is applied. These piezoelectric motors include a well-traveling motor used for auto focus and reflex cameras, and rectangular 4-quadrant motors utilized with high powered density applications with speed ranging from ten nm/s to 800 mm/s. The control signal for these piezoelectric systems is that associated with any conventional linear control system. Thus, there will be an analog voltage that will be output to control the operation thereof, as opposed to the operation of a digitally controlled stepping motor or DC motor which requires a digital value. Thus, it is necessary to output an analog controlled voltage which has a predetermined shape.

Figure 12:
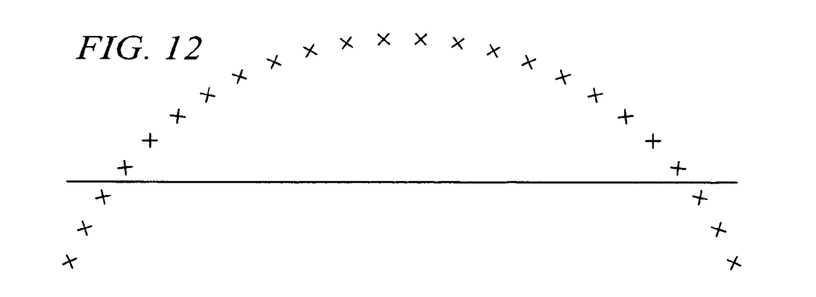
FIG. 12 illustrates a diagrammatic view of the analog output of the motor controller.

The system operates similar to the above-noted system in that the DMA 502 addresses the pattern memory 506 to output information to a multiplexer 510, which is controlled by the DMA via the control line 511 that activates the multiplexer 510 to select the output of the memory 506 for input to the D-input of a flip-flop 1103 similar to the pre-latch flip-flop 514 of FIG. 5. The Q-output thereof is fed back to the other input of the multiplexer 510 for the latch operation. The Q-output is input to a digital-to-analog converter (DAC) 1104. The DAC 1104 is operable to convert the data related to analog data and output it to a driver circuit 1106 to drive the output of the piezoelectric motor 1102. The DAC 1104 is operable to convert the data in accordance with a conversion signal received on a line 1110. This is output from a multiplexer 1112 that selects between the interrupt output of a timer 1114 or the output of a digital frequency synthesizer 1116. The digital frequency synthesizer is operable to generate a more precisely controlled output such that the frequency thereof can be varied. The operation of this is illustrated in FIG. 12.

Although the preferred embodiment has been described in detail, it should be understood that various changes, substitutions and alterations can be made therein without departing from the scope of the invention as defined by the appended claims.

What is claimed is:

1. A method for generating a sequential pattern of motor control instructions under control of an interrupt driven microcontroller for controlling a stepper motor with a periodic pattern of instructions, comprising the steps of:
   storing a pattern of motor control instructions in a memory;
   generating a periodic output sync signal;
   the microcontroller initiating a sequential read operation of the memory so as to cause sequential reading and output of motor control instructions from the memory in a predetermined order in accordance with the stored pattern and prioritized by interrupts;
   storing each of the read motor control instructions in a pre-load buffer after output from the memory; and
   transferring the contents of the pre-load buffer to an output buffer for controlling the motor in synchronization with and under control of the output sync signal, wherein the output of motor control instructions from the memory is not required to be periodic such that the microcontroller can service interrupts and operate in a non-periodic manner whereas the instructions are output in a periodic manner.

2. The method of claim 1, wherein the sequential read operation is controlled by a secondary process operation independent of the operation of the microcontroller but parameterized thereby, the secondary process operable to cause a read motor control instruction to be input to the pre-load buffer prior to the occurrence of an output sync signal.

3. The method of claim 2, wherein the operation of the microcontroller and the operation of the step of generating the periodic output sync signal are synchronized with a common time base, and wherein the step of storing the read motor control instructions in the pre-load register is controlled by the common time base.

4. The method of claim 2, wherein the secondary process is a direct memory access (DMA) controller.

5. The method of claim 4, and further comprising the step of interrupting the operation of the microcontroller after the step of parameterizing, such that the operation of the microcontroller is not required to output instructions after such step of parameterizing.

6. The method of claim 1, wherein the output has a digital width of a first length.

7. The method of claim 6, wherein the output of the memory has a digital width of a second length and less than the first length and the first length is an integral multiple of the second length, and the sequential read operation is operable to read the memory at least two times for each instruction wherein each motor control instruction comprises multiple portions requiring multiple reads of the memory, the step of storing the read motor control instructions in the pre-load buffer after output from the memory comprises the step of storing each of the multiple portions in the pre-load buffer in at least two successive reads and at least two successive stores for each of the read motor control instructions, and the step of transferring the contents of the pre-load buffer to one of multiple output buffers in synchronization with the output sync signal, each of the output buffers associated with one of the multiple portions wherein the output of motor control instructions from the memory is not required to be periodic.

8. A method for generating a sequential pattern of motor control analog output values under control of an interrupt driven microcontroller for the controlling a stepper motor with a sinusoidal drive signal, comprising the steps of:
   storing a pattern of digital values corresponding to motor control instructions in a memory;

generating a periodic output sync signal; the microcontroller initiating a sequential read operation of the memory so as to cause sequential reading and output of digital values corresponding to motor control instructions from the memory in a predetermined order in accordance with the stored pattern and prioritized by interrupts;

storing each of the read digital values in a pre-load buffer after output from the memory; and converting the digital values stored in the pre-load buffer to analog values in synchronization with and under control of the output sync signal for controlling the motor, wherein the output of digital values for controlling the motor corresponding to the motor control instructions from the memory is not required to be periodic such that the microcontroller can service interrupts and operate in a non-periodic manner whereas the instructions are output in a periodic manner.

9. The method of claim 8, wherein the sequential read operation is controlled by a secondary process operation independent of the operation of the microcontroller but parameterized thereby, the secondary process operable to cause a read motor control instruction to be input to the pre-load buffer prior to the occurrence of an output sync signal.

10. The method of claim 8, wherein the operation of the microcontroller and the operation of the step of generating the periodic output sync signal are synchronized with a common time base, and wherein the step of storing the read motor control instructions in the pre-load register is controlled by the common time base.

11. The method of claim 9, wherein the secondary process is a direct memory access (DMA) controller.

12. The method of claim 11, and further comprising the step of interrupting the operation of the microcontroller after the step of parameterizing, such that the operation of the microcontroller is not required to output instructions after such step of parameterizing.

13. The method of claim 8, wherein the step of generating the periodic signal is operable to be varied to vary the speed of the motor.

14. A stepper motor controller for generating a sequential pattern of motor control instructions under control of an interrupt driven microcontroller for controlling a stepper motor with a periodic pattern of instructions, comprising:

a memory for storing a pattern of motor control instructions;

a timer for generating a periodic output sync signal;

the microcontroller initiating a sequential read operation of the memory so as to cause sequential reading and output of motor control instructions from the memory in a predetermined order in accordance with the stored pattern and prioritized by interrupts;

a pre-load buffer for storing each of the read motor control instructions after output from the memory; and a gating circuit for transferring the contents of said pre-load buffer to an output buffer for controlling the motor in synchronization with and under control of the output sync signal, wherein the output of motor control instructions from said memory is not required to be periodic such that the microcontroller can service interrupts and operate in a non-periodic manner whereas the instructions are output in a periodic manner.

15. The motor controller of claim 14, wherein the sequential read operation is controlled by a secondary processor operating independent of the operation of the microcontroller but parameterized thereby, the secondary processor operable to cause the read motor control instructions to be input to said pre-load buffer prior to the occurrence of an output sync signal from said timing generator.

16. The motor controller of claim 15, wherein the operation of the microcontroller and the operation of said timer are synchronized with a common time base, and wherein the common time base controls storing of the read motor control instructions in said pre-load register.

17. The method of claim 15, wherein the secondary process is a direct memory access (DMA) controller.

18. The method of claim 17, and wherein the microcontroller is operable to enter a sleep mode which interrupts the operation of the microcontroller after parameterizing the DMA, such that the operation of the microcontroller is not required to output instructions after such parameterizing.

* * * * *